United States Patent
Kariyama et al.

(10) Patent No.: US 9,874,238 B2
(45) Date of Patent: Jan. 23, 2018

(54) BICYCLE END CAP

(71) Applicant: Shimano Inc., Sakai, Osaka (JP)

(72) Inventors: Osamu Kariyama, Osaka (JP);
Masahiro Nakakura, Osaka (JP);
Takahiro Yamashita, Osaka (JP)

(73) Assignee: Shimano Inc., Osaka (JP)

( * ) Notice: Subject to any disclaimer, the term of this patent is extended or adjusted under 35 U.S.C. 154(b) by 696 days.

(21) Appl. No.: 13/869,283

(22) Filed: Apr. 24, 2013

(65) Prior Publication Data

US 2014/0318307 A1    Oct. 30, 2014

(51) Int. Cl.
| | |
|---|---|
| *F16C 1/10* | (2006.01) |
| *B62L 3/02* | (2006.01) |
| *B60T 7/10* | (2006.01) |
| *B60T 11/04* | (2006.01) |
| *F16D 65/18* | (2006.01) |
| *B62K 23/06* | (2006.01) |
| *B62K 19/38* | (2006.01) |
| *F16C 1/12* | (2006.01) |
| *F16C 1/26* | (2006.01) |
| *F16D 125/60* | (2012.01) |
| *B62J 99/00* | (2009.01) |

(52) U.S. Cl.
CPC .............. *F16C 1/102* (2013.01); *B60T 7/102* (2013.01); *B60T 11/046* (2013.01); *B62K 23/06* (2013.01); *B62L 3/023* (2013.01); *F16D 65/18* (2013.01); *B62J 2099/0046* (2013.01); *B62K 19/38* (2013.01); *F16C 1/12* (2013.01); *F16C 1/265* (2013.01); *F16D 2125/60* (2013.01); *Y10T 74/2045* (2015.01)

(58) Field of Classification Search
USPC ...... 74/502.4, 502.6; 248/65, 68.1; 254/389; 188/24.11
See application file for complete search history.

(56) References Cited

U.S. PATENT DOCUMENTS

| | | | | |
|---|---|---|---|---|
| 1,225,100 | A | * | 5/1917 | Aubrey ........................... 294/74 |
| 4,678,360 | A | * | 7/1987 | Miller ............................ 403/353 |
| 5,425,434 | A | * | 6/1995 | Romano .................... 188/24.19 |
| 2004/0041136 | A1 | | 3/2004 | Ames et al. |
| 2006/0152071 | A1 | * | 7/2006 | Takeuchi ..................... 303/9.64 |
| 2012/0273308 | A1 | | 11/2012 | Uchida et al. |

FOREIGN PATENT DOCUMENTS

| | | |
|---|---|---|
| DE | 102007040293 A1 | 3/2009 |
| JP | 2006-183831 A | 7/2006 |

\* cited by examiner

*Primary Examiner* — Vicky A Johnson
(74) *Attorney, Agent, or Firm* — Global IP Counselors, LLP

(57) ABSTRACT

A bicycle end cap has a first end and a second end that is opposite to the first end for attaching to a bicycle line shape member. The bicycle end cap includes a tubular portion and an attachment structure. The tubular portion defines a first opening that is arranged at the first end and a receiving space that is dimension to axially receive the line shape member from the first opening. The attachment structure is configured to attach a pulling member having a cable portion and a head portion that has larger diameter than the cable portion. The attachment structure is configured to position the head portion relative to the tubular portion as the cable portion is pulled toward the second end.

13 Claims, 9 Drawing Sheets

BICYCLE END CAP

BACKGROUND

Field of the Invention

This invention generally relates to a bicycle end cap for attaching to a bicycle line shape member. More specifically, the present invention relates to a bicycle end cap used for routing a bicycle line shape member.

Background

Most bicycles are provided with various bicycle line shape members such as hydraulic hoses, control cables, electric cables and the like for controlling an operated device using an actuating device. Typically, the bicycle line shape members are routed along the exterior surface of the bicycle frame from the actuating device to the operated device. More recently, some bicycles route of the control cables through the bicycle frame to reduce aerodynamic drag.

SUMMARY

Generally, the present disclosure is directed to various features of a bicycle end cap that can be used for routing bicycle line shape members through a bicycle frame.

In view of the state of the known technology and in accordance with one aspect of the present invention, a bicycle end cap is provided that has a first end and a second end that is opposite to the first end for attaching to a bicycle line shape member. The bicycle end cap basically comprises a tubular portion and an attachment structure. The tubular portion defines a first opening that is arranged at the first end and a receiving space that is dimension to axially receive the line shape member from the first opening. The attachment structure is configured to attach a pulling member having a cable portion and a head portion that has larger diameter than the cable portion. The attachment structure is configured to position the head portion relative to the tubular portion as the cable portion is pulled toward the second end.

In accordance with a second aspect of the present invention, the bicycle end cap according to the first aspect is configured so that the attachment structure includes a positioning portion and a through hole. The positioning portion is arranged at the receiving space. The through hole is arranged at the second end such that the cable portion passes through therein as the head portion is disposed at the positioning portion.

In accordance with a third aspect of the present invention, the bicycle end cap according to the second aspect is configured so that the through hole extends along a center axis of the tubular portion.

In accordance with a fourth aspect of the present invention, the bicycle end cap according to the first aspect is configured so that the tubular portion includes a cylindrical outer surface.

In accordance with a fifth aspect of the present invention, the bicycle end cap according to the first aspect is configured so that the second end has a hemispherical shaped.

In accordance with a sixth aspect of the present invention, the bicycle end cap according to the fifth aspect is configured so that the tubular portion includes a cylindrical outer surface which connects to the second end without unevenness.

In accordance with a seventh aspect of the present invention, the bicycle end cap according to the second aspect is configured so that the second end has at least one additional through hole that is transverse to non-parallel to a center axis of the tubular portion.

In accordance with an eighth aspect of the present invention, the bicycle end cap according to the seventh aspect is configured so that the through hole and the at least one additional through hole are arranged so as to be not communicated each other.

In accordance with a ninth aspect of the present invention, the bicycle end cap according to the eighth aspect is configured so that the through hole extends along a center axis of the tubular portion.

In accordance with a tenth aspect of the present invention, the bicycle end cap according to the ninth aspect is configured on that the at least one additional through hole extends perpendicularly relative to the center axis of the tubular portion as the tubular portion is seen in a radial direction of the tubular portion.

In accordance with an eleventh aspect of the present invention, the bicycle end cap according to the tenth aspect is configured so that the at least one additional through hole includes first additional through hole and a second additional through hole. The through hole is arranged between the first and second additional through holes.

In accordance with a twelfth aspect of the present invention, a hydraulic bicycle structure including the bicycle end cap according to the first aspect is provided that comprises a hydraulically operated device and a hydraulic hose. The hydraulic hose has a first connecting end attached to the hydraulically operated device and a second connecting end with the bicycle end cap attached thereto.

In accordance with a thirteen aspect of the present invention, a hydraulic bicycle structure including the bicycle end cap according to the first aspect provided that comprises a hydraulic actuating device and a hydraulic hose. The hydraulic hose has a first connecting end with the bicycle end cap attached thereto and a second connecting end attached to the hydraulic actuating device.

Various objects, features, aspects and advantages of the disclosed bicycle end cap will become apparent to those skilled in the art from the following detailed description, which, taken in conjunction with the annexed drawings, discloses preferred embodiments of the bicycle end cap.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
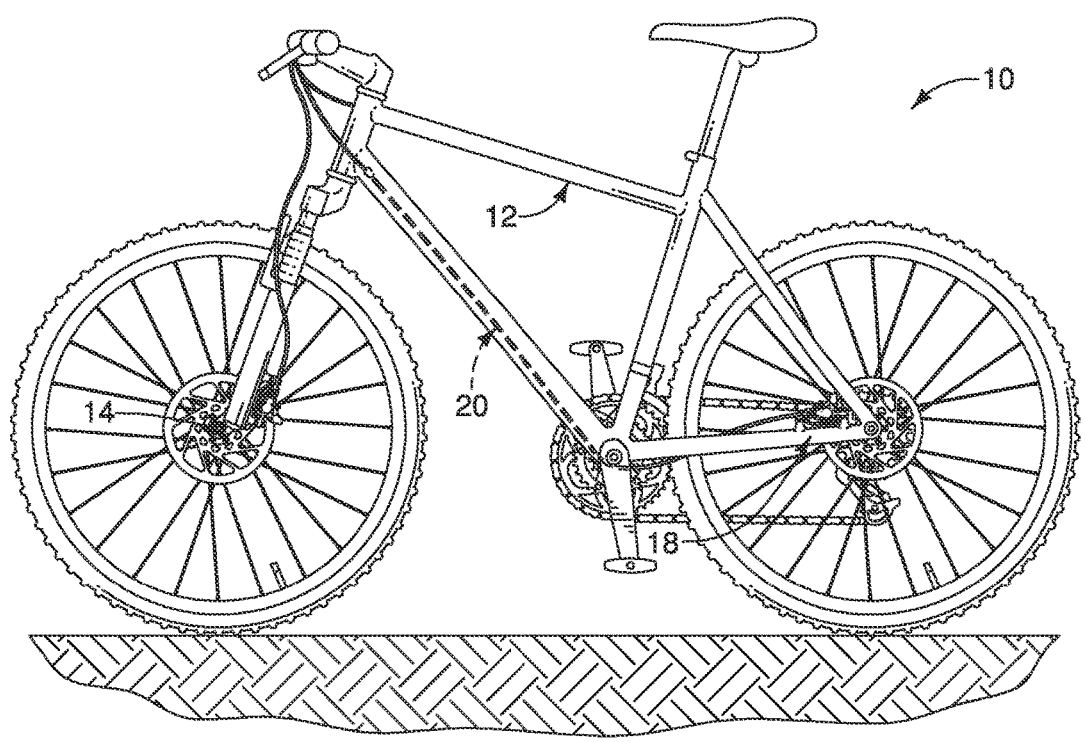
FIG. 1 is a side elevational view of a bicycle having a bicycle frame that is equipped with a hydraulic braking system thereto, in which a hydraulic hose that extends between hydraulic actuating device and a hydraulically operated device was routed inside a bicycle frame by using a bicycle end cap in accordance with one embodiment.
Figure 2:
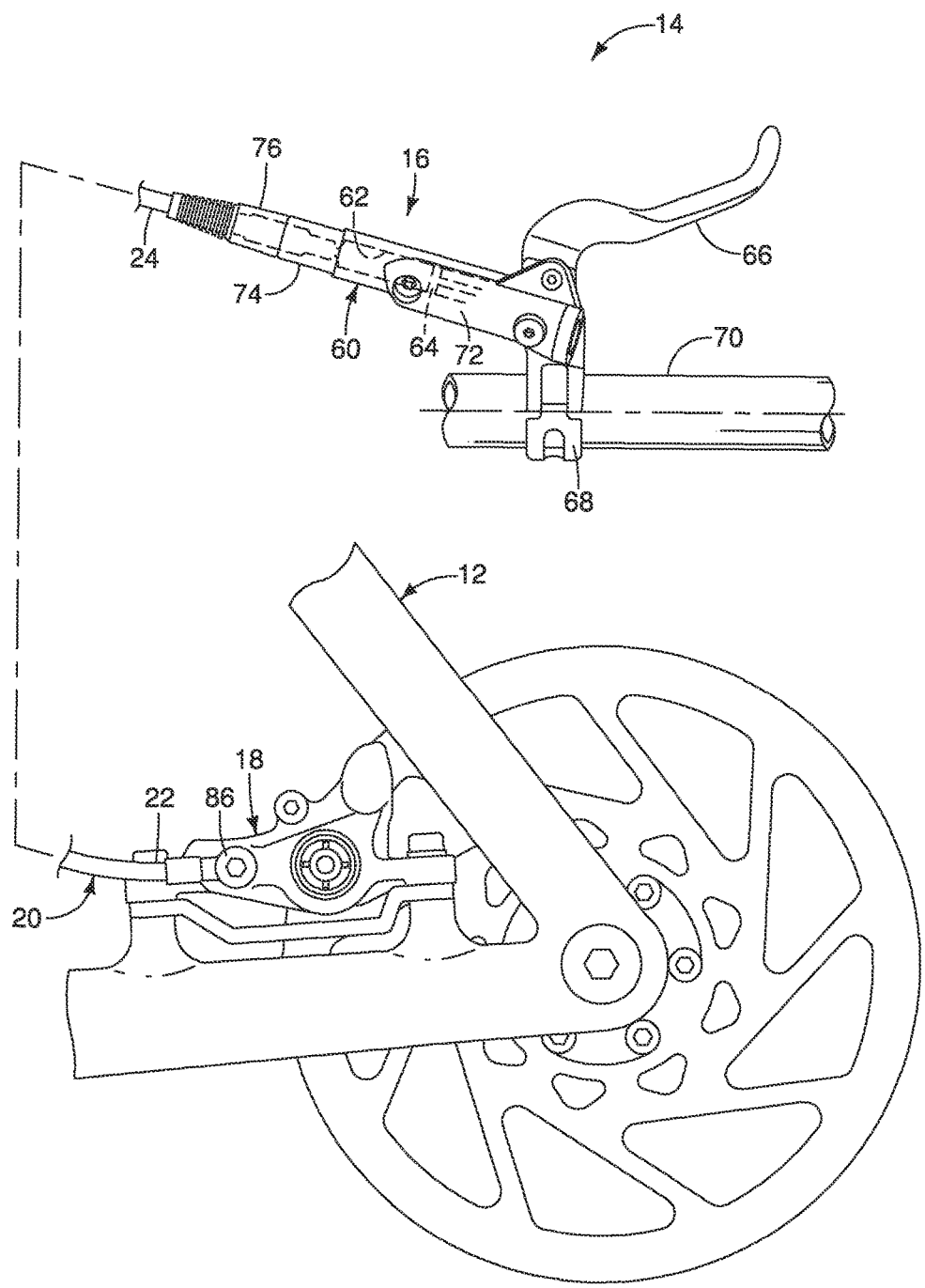
FIG. 2 is a diagrammatic view of a rear disc brake assembly including a hydraulic hose having one end fluidly connected to a hydraulic actuating device (i.e., a hydraulic brake actuating device) and the other end fluidly connected to a hydraulically operated device (i.e., a hydraulic brake caliper) in accordance with one embodiment.

Referring initially to FIGS. 1 and 2, a bicycle 10 is illustrated having a bicycle frame 12 that is equipped with a hydraulic bicycle structure 14. Basically, the hydraulic bicycle structure 14 comprises a hydraulic actuating device 16, a hydraulically operated device 18 and a hydraulic hose 20. it this illustrated embodiment, the hydraulic bicycle structure 14, the hydraulic actuating device 16 and the hydraulically operated device 18 are a rear disc brake assembly of a hydraulic braking system, a hydraulic brake lever device and a hydraulic brake caliper respectively. The hydraulic hose 20 has a first connecting end 22 that is attached to the hydraulically operated device 18, and a second connecting end 24 that is attached to the hydraulic actuating device 16. The hydraulic hose 20 is a conventional flexible hose that is used in hydraulic braking systems such as the hydraulic braking system illustrated in FIG. 2.

Figure 5:
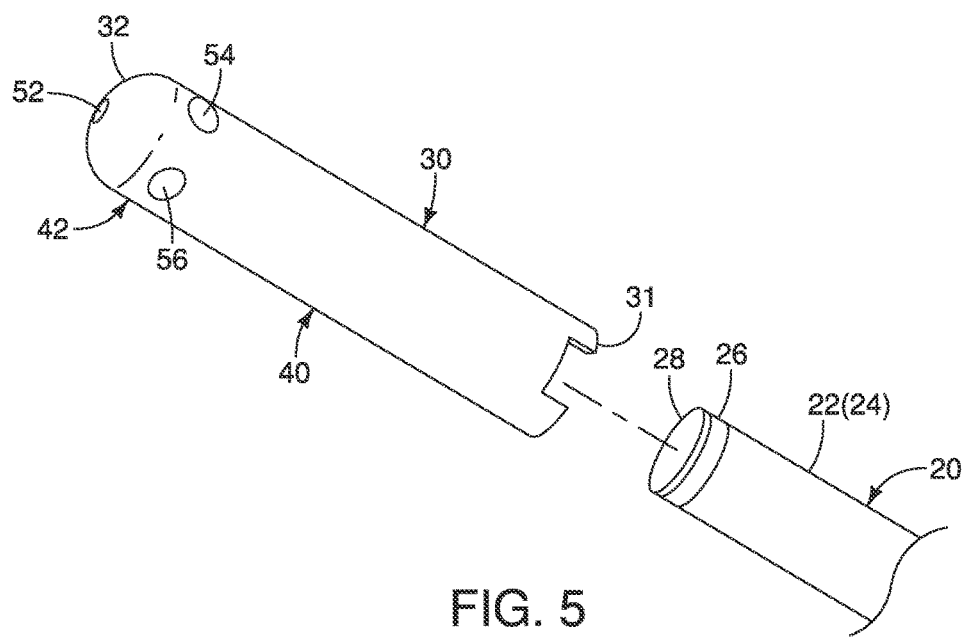
FIG. 5 is an enlarged perspective view of the bicycle end cap attached to one end of the hydraulic hose.
Figure 6:
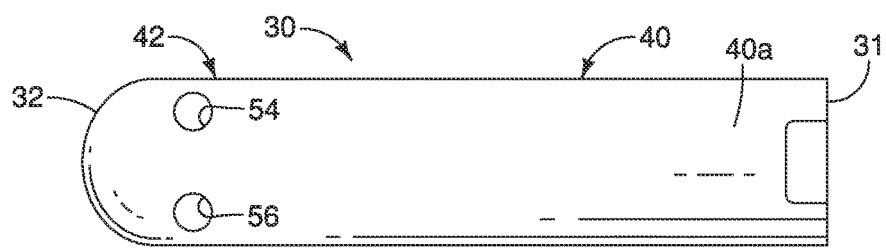
FIG. 6 is a first enlarged side view of the bicycle end cap illustrated in FIGS. 3 to 5.
Figure 7:
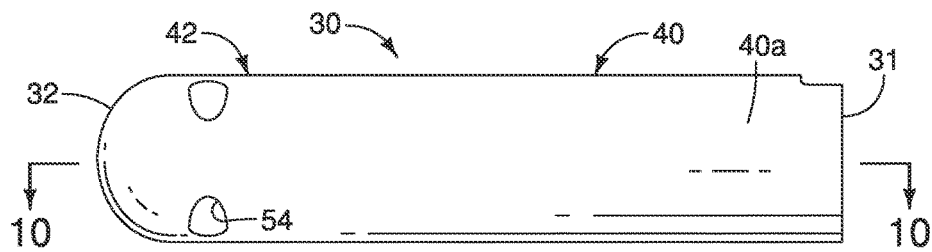
FIG. 7 is a second enlarged side view of the bicycle end cap illustrated in FIGS. 3 to 6.
Figure 8:
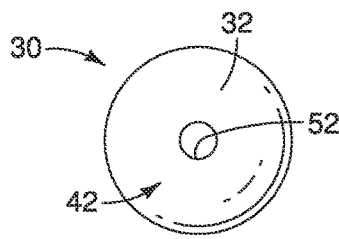
FIG. 8 is a first enlarged end view of the bicycle end cap, which corresponds to the left side of the bicycle end cap in FIGS. 6 and 7.
Figure 9:
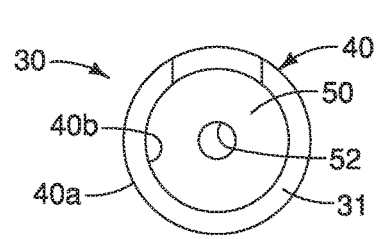
FIG. 9 is a second enlarged end view of the bicycle end cap, which corresponds to the right side of the bicycle end cap in FIGS. 6 and 7.
Figure 10:
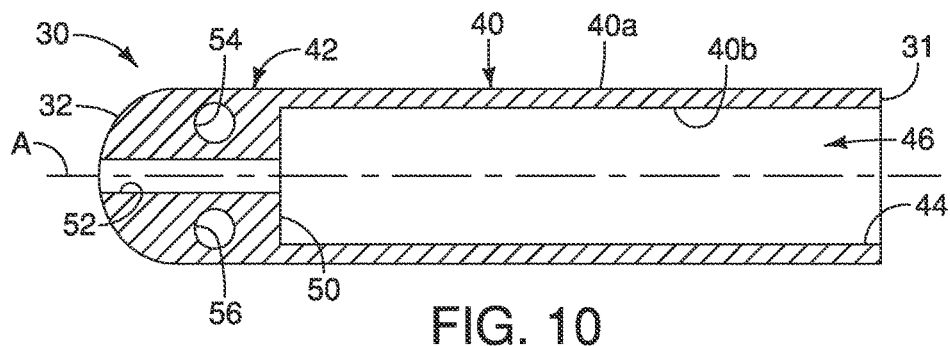
FIG. 10 is a longitudinal cross-sectional view of the bicycle end cap illustrated in FIGS. 5 to 9 as seen along section line 10-10 in FIG. 7.
Figure 12:
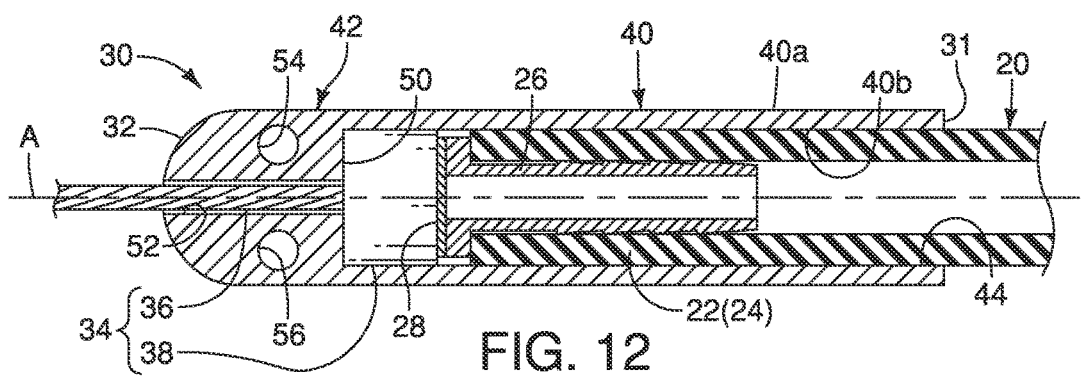
FIG. 12 is a longitudinal cross-sectional view, similar to FIGS. 10 and 11, of the bicycle end cap, but with the pulling member and one end of the hydraulic hose attached thereto.

As in FIGS. 5 and 12, one or both of the first and second connecting ends 22 and 24 can be provided with a tubular insert 26 and a sealing member 28. The tubular insert 26 is a conventional member that has an annular flange and a tubular section. The outer surface of the tubular section of the tubular insert 26 has a plurality of inclined barbs such that the tubular section is securely retained in the interior passage of the hydraulic hose 20. The tubular insert 26 is constructed of a rigid material such as a metallic material. For example, the tubular insert 26 can be formed of a copper or a copper alloy. Of course, any suitable rigid material can be utilized for the tubular insert 26 as needed and/or desired. The sealing member 28 is adhesively attached to the annular flange to seal off the interior passage of the hydraulic hose 20. In this way, with both of the first and second connecting ends 22 and 24 sealed with one of the sealing member 28, the hydraulic hose 20 can be completely prefilled with hydraulic fluid and prior to attachment to the hydraulic actuating device 16 and/or the hydraulically operated device 18. Alternatively, only one of the first and second connecting ends 22 and 24 is sealed with one of the sealing member 28, while the other one of the first and second connecting ends 22 and 24 is attached to either the hydraulic actuating device 16 or the hydraulically operated device 18. In this way, one of the hydraulic actuating device 16 and the hydraulically operated device 18 and the hydraulic hose 20 can be completely prefilled with hydraulic fluid and prior to attachment to the other of the hydraulic actuating device 16 and the hydraulically operated device 18.

Figure 3:
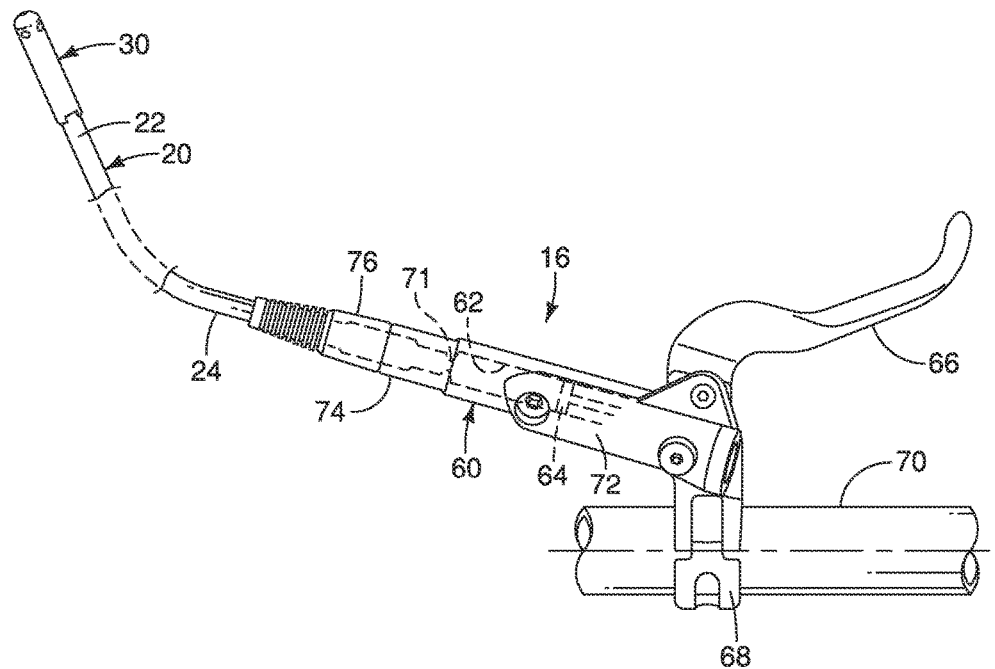
FIG. 3 is a top view of the hydraulic actuating device with one end of the hydraulic hose connected to the hydraulic actuating device and the other end of the hydraulic hose having the bicycle end cap attached thereto.
Figure 4:
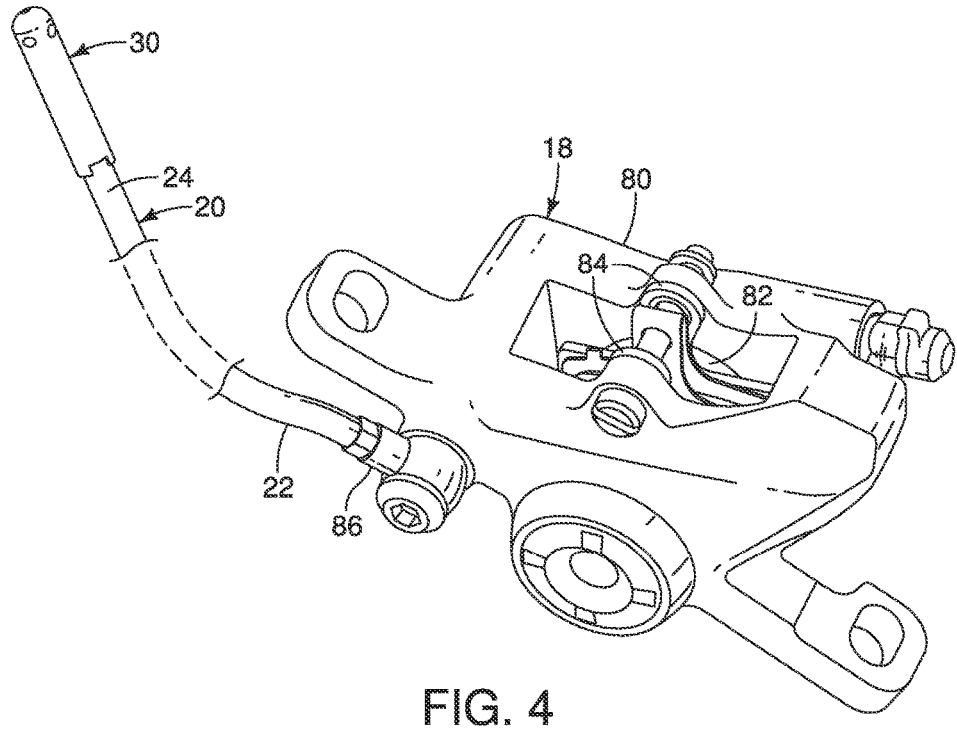
FIG. 4 is an enlarged perspective view of the hydraulically operated device with one end of the hydraulic hose connected to the hydraulically operated device and the other end of the hydraulic hose having the bicycle end cap attached thereto.

As seen in FIGS. 3 to 5, the hydraulic bicycle structure 14 (i.e., the rear disc brake assembly) further comprises a bicycle end cap 30 that is attached to the hydraulic hose 20 for protecting the sealing member 28 and for routing the hydraulic hose 20 in one or more tubular parts of the bicycle frame 12 as discussed below. However, it will be apparent to those skilled in the art from this disclosure that the bicycle end cap 30 is not limited to routing hydraulic hoses in one or more tubular parts of the bicycle frame 12. Rather, the bicycle end cap 30 can be used for routing various "line shape members". The hydraulic hose 20 is one example of a line shape member. As used herein, the term "line shape member" as used herein includes a hydraulic hose, an outer casing of Bowden cable and an electric cable.

As seen in FIGS. 3 and 4, prior to installation of the rear disc brake assembly 14 to the bicycle frame 12, the bicycle end cap 30 can be provided on either the first connecting end 22 (FIG. 3), or the second connecting end 24 (FIG. 4). More specifically, prior to installation of the rear disc brake assembly 14 to the bicycle frame 12, as seen in FIG. 3, the hydraulic hose 20 can have the first connecting end 22 provided with the bicycle end cap 30 attached thereto and can have the second connecting end 24 attached to the hydraulic actuating device 16. Then after the bicycle end cap 30 has been used for routing the hydraulic hose 20 in one or more tubular parts of the bicycle frame 12, the bicycle end cap 30 will then be removed and the hydraulically operated device 18 will then be attached to the first connecting end 22 of the hydraulic hose 20, as discussed below. Alternatively, prior to installation of the hydraulic bicycle structure 14 to the bicycle frame 12, as seen in FIG. 4, the hydraulic hose 20 can have the first connecting end 22 attached to the hydraulically operated device 18, and can have the second connecting end 24 provided with the bicycle end cap 30 attached thereto. Then after the bicycle end cap 30 has been used for routing the hydraulic hose 20 in one or more tubular parts of the bicycle frame 12, the bicycle end cap 30 will then be removed and the hydraulic actuating device 16 will then be attached to the second connecting end 24 of the hydraulic hose 20, as discussed below.

Figure 11:
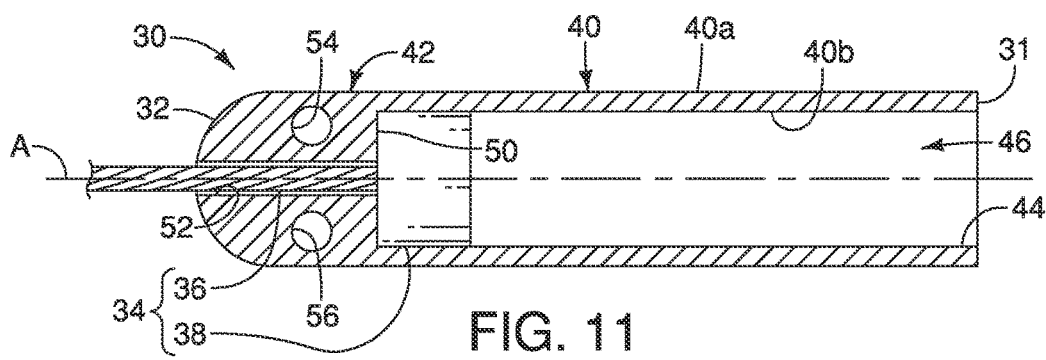
FIG. 11 is a longitudinal cross-sectional view, similar to FIG. 10, of the bicycle end cap, but with a pulling member (e.g., a bicycle shift control cable) attached thereto.

Referring now to FIGS. 5 to 10, the bicycle end cap 30 will now be discussed in more detail. Preferably, the bicycle end cap 30 is a one-piece, unitary member as in the illustrated embodiment. The bicycle end cap 30 can be made of a variety of materials. The bicycle end cap 30 can be made of a hard rigid material such as a hard plastic or metal. The bicycle end cap 30 has a first end 31 and a second end 32. The second end 32 is opposite to the first end 31. The first end 31 is configured for attaching to the hydraulic hose 20 (i.e., a. bicycle line shape member) as explained. below. The second end 32 has a hemispherical shaped, and is configured such that a pulling member 34 extends therefrom, as seen FIGS. 11 to 13, for pulling the bicycle end cap 30 into and through a tubular portion the bicycle frame 12. Preferably, as seen in the illustrated embodiment, the pulling member 34 is a bicycle control cable such as an inner wire of a bicycle shift cable that is commonly used for cable operated bicycle shifters. The pulling member 34 has a cable portion 36 (i.e., an inner wire in the illustrated embodiment) and a head portion 38 (i.e., a cable nipple in the illustrated embodiment). The head portion 38 has larger diameter than the cable portion 36.

The bicycle end cap 30 basically comprises a tubular portion 40 and an attachment structure 42. The tubular portion 40 includes a cylindrical outer surface 40a. Preferably, the cylindrical outer surface 40a connects to the second end 32 without unevenness (i.e., smooth transition without any abrupt changes). The attachment structure 42 is the section of the bicycle end cap 30 that extends from the tubular portion 40 to the second end 32.

The tubular portion 40 defines a first opening 44 and a receiving space 46. The first opening 44 is arranged at the first end 31. The receiving space 46 is dimension to axially receive the hydraulic hose 20 (i.e., the bicycle line shape member) from the first opening 44. Preferably, the receiving space 46 is dimension such that the hydraulic hose 20 is frictionally retained in the receiving space 46. More preferably, the receiving space 46 is dimension such that the hydraulic hose 20 is slightly compressed when inserted into the receiving space 46. While the receiving space 46 is illustrated as being defined by a smooth cylindrical inner surface 40b of the tubular portion 40, the inner surface 40b of the tubular portion 40 can be rough or provided with friction enhancing features such as projections.

The attachment structure 42 is configured to attach the pulling member 34 to the bicycle end cap 30. The attachment structure 42 is configured to position the head portion 38 relative to the tubular portion 40 as the cable portion 36 is pulled toward the second end 32. The attachment structure 42 includes a positioning portion 50 and a through hole 52. The positioning portion 50 is arranged at the receiving space 46. The through hole 52 is arranged at the second end 32 such that the cable portion 36 passes through therein as the head portion 38 is disposed at the positioning portion 50. The through hole 52 extends along a center axis A of the tubular portion 40. The second end 32 includes a first additional through hole 54 and a second additional through hole 56 in the illustrated embodiment. The first and second additional through holes 54 and 56 are each transverse to non-parallel to the center axis A of the tubular portion 40. More preferably, the first and second additional through holes 54 and 56 each extends perpendicularly relative to the center axis A of the tubular portion 40 as the tubular portion 40 viewed in a radial direction of the tubular portion 40. The through hole 52 and the first and second additional through holes 54 and 56 are arranged so as to be not communicated each other. The through hole 52 is arranged between the first and second additional through holes 54 and 56.

While in the illustrated embodiment the attachment structure 42 includes first and second additional through holes 54 and 56, it will be apparent from this disclosure that one or more than two additional through holes can be provided as needed and/or desired. In other words, the second end 32 has at least one additional through hole that is transverse to non-parallel to the center axis A of the tubular portion 40. More preferably, the at least one additional through hole extends perpendicularly relative to the center axis A of the tubular portion 40 as the tubular portion 40 is seen in a radial direction of the tubular portion 40. Also more preferably, the through hole 52 and the at least one additional through hole are arranged so as to be not communicated each other. As mentioned above, in the illustrated embodiment, the at least one additional through hole includes the first additional through hole 54 and the second additional through hole 56.

Referring back to FIGS. 2 and 3, the hydraulic actuating device 16 is a conventional brake actuating device or brake operating device that basically includes a brake housing 60 defining a master cylinder 62, a piston 64 and a brake lever 66. The brake housing 60 further has a clamp 68 for attaching the hydraulic actuating device 16 to a handlebar 70 of the bicycle 10 in a conventional manner. The brake lever 66 is pivotally coupled to the brake housing 60 for reciprocating the piston 64 in the master cylinder 62 to operate the hydraulically operated device 18. The master cylinder 62 has a master cylinder bore or chamber 71 in which the piston 64 is reciprocally mounted. The piston 34 is biased with a compression spring (not shown) disposed within the master cylinder bore 71. The master cylinder 62 also has a hydraulic fluid reservoir 72 that is in fluid communication with the master cylinder bore 71. The hydraulic fluid reservoir 72 contains the hydraulic fluid (e.g., mineral oil) which is pressurized by movement of the piston 64 in the master cylinder bore 71 in response to the pivotal movement of the brake lever 66 towards the handlebar 70. In other words, the brake lever 66 is operatively coupled to the piston 64 for moving the piston 64 between a piston rest position and a piston operating position. The brake housing 66 also has a hose attachment section 74 (e.g., an attachment portion) with an internal threaded bore that is used to attach the second connecting end 24 of the hydraulic hose 22 to the hydraulic actuating device 16 using a conventional hose connector 76. Since the operation and construction of the hydraulic actuating device 16 are conventional, the hydraulic actuating device 16 will not be discussed or shown in further detail herein.

Referring to FIGS. 2 and 4, the hydraulically operated device 18 is a conventional brake caliper that basically includes a brake housing 80, a pair of pistons 82 (only one shown in FIG. 4) and a pair of brake pads 84. The pistons 82 are movably mounted in cylinders defined by the brake housing 80 in a conventional manner. In response to operation of the brake lever 66, the pistons 82 move towards each other to also move the brake pads 84 towards each other due to fluid pressure entering the brake housing 80 via the hydraulic hose 20. Here, a conventional hose connector 86 is used to attach the first connecting end 22 of the hydraulic hose 20 to a hydraulic fluid passageway formed in the brake housing 80. Since the operation and construction of the hydraulically operated device 18 are conventional, the hydraulically operated device 18 will not be discussed or shown in further detail herein.

Figure 13:
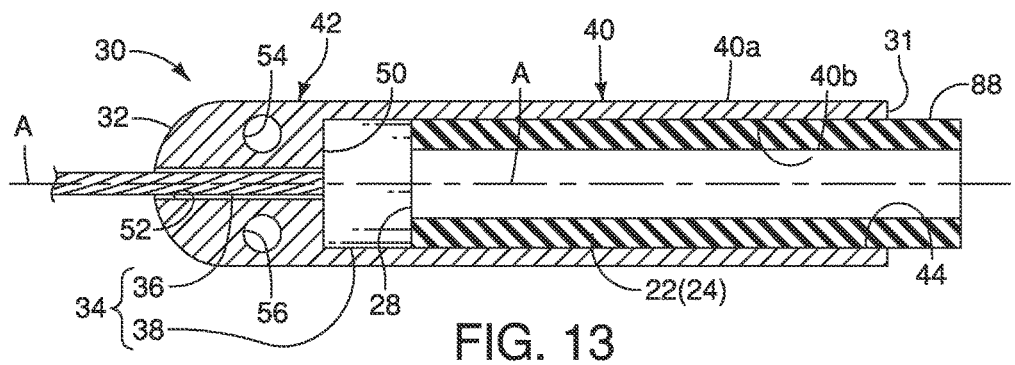
FIG. 13 is a longitudinal cross-sectional view, similar to FIGS. 10 to 12, of the bicycle end cap, but with the pulling member and a piece of a scrap hydraulic hose attached thereto.

Referring primarily to FIGS. 13 to 19, one possible routing process will now be discussed that uses the bicycle end cap 30 to rout the hydraulic hose 20 within the bicycle frame 12. As previously mentioned, the bicycle end cap 30 can be initially attached to one end of the hydraulic hose 20, while the other end of the hydraulic hose 20 is attached to either one of the hydraulic actuating device 16 and the hydraulically operated device 18. Of course, the bicycle end cap 30 can be an item that is provided separately by itself from any other part. In any case, after obtaining the bicycle end cap 30, the pulling member 34 is attached to the bicycle end cap 30 by inserting the cable portion 36 into the through hole 52 from the receiving space 46 and pulling the cable portion 36 until the head portion 38 contacts the positioning portion 50 of the attachment structure 42. Then a piece of a scrap hydraulic hose 88 is inserted into the receiving space 46 to hold the head portion 38 against the positioning portion 50 as seen in FIG. 13. Of course, it will be apparent from this disclosure that the scrap hydraulic hose 88 can be replaced with some other holding member that will be retained in the receiving space 46 to hold the head portion 38 against the positioning portion 50.

Figure 14:
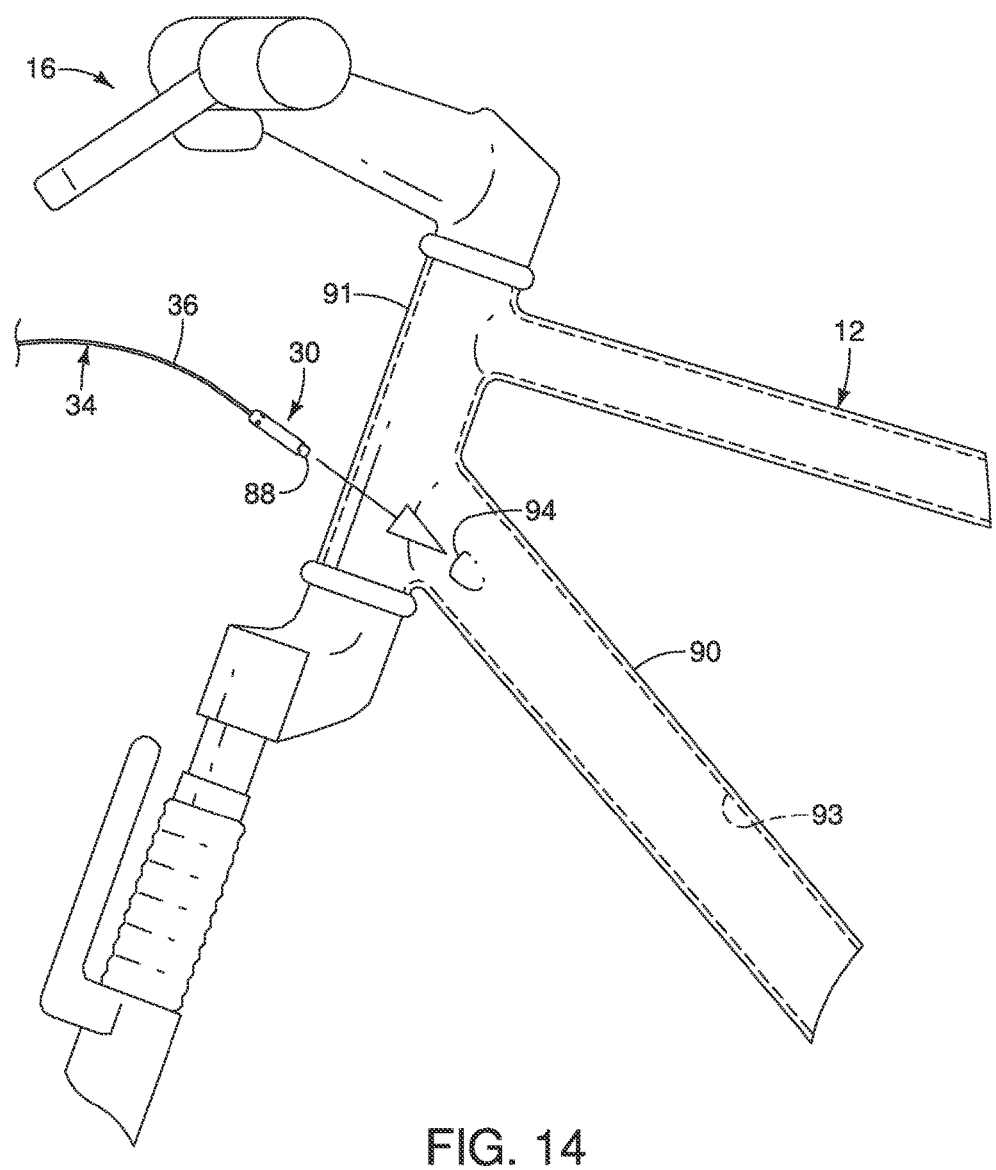
FIG. 14 is a side elevational view of a portion of the bicycle frame illustrated in FIG. 1 with the bicycle end cap being attached to the pulling member by using the scrap hydraulic hose as illustrated in FIG. 13 and the bicycle end cap being positioned to be inserted into a down tube of the bicycle frame adjacent to a head tube of the bicycle frame.

Next, as seen in FIG. 14, the bicycle end cap 30, which is attached to the pulling member 34 using the scrap hydraulic hose 88 as illustrated in FIG. 13 is now ready to be installed inside a tubular member of the bicycle frame 12. In the illustrated embodiment, the hydraulic hose 20 will be installed into a down tube 90 of the bicycle frame 12. The hydraulic hose 20 will basically run inside the down tube 90 from a point adjacent to a head tube 91 of the bicycle frame 12 to a point adjacent to a hanger tube 92 of the bicycle frame 12. More specifically, as best seen in FIG. 14, the down tube 90 has a hollow interior 93 for receiving the hydraulic hose 20. As Seen in FIGS. 15 to 19, the down tube 90 is further provided with a first opening 94 that communicates with the hollow interior 93 of the down tube 90 and a second opening 96 that communicates with the hollow interior 93 of the down tube 90. Of course, it will be apparent from this disclosure that the first and second openings 94 and 96 can be located at other parts of the frame. For example, the first opening 94 can be formed in the head tube 91 of the bicycle frame 12 and the second opening 96 can be formed in the hanger tube 92 of the bicycle frame 12 if needed and/or desired.

Figure 15:
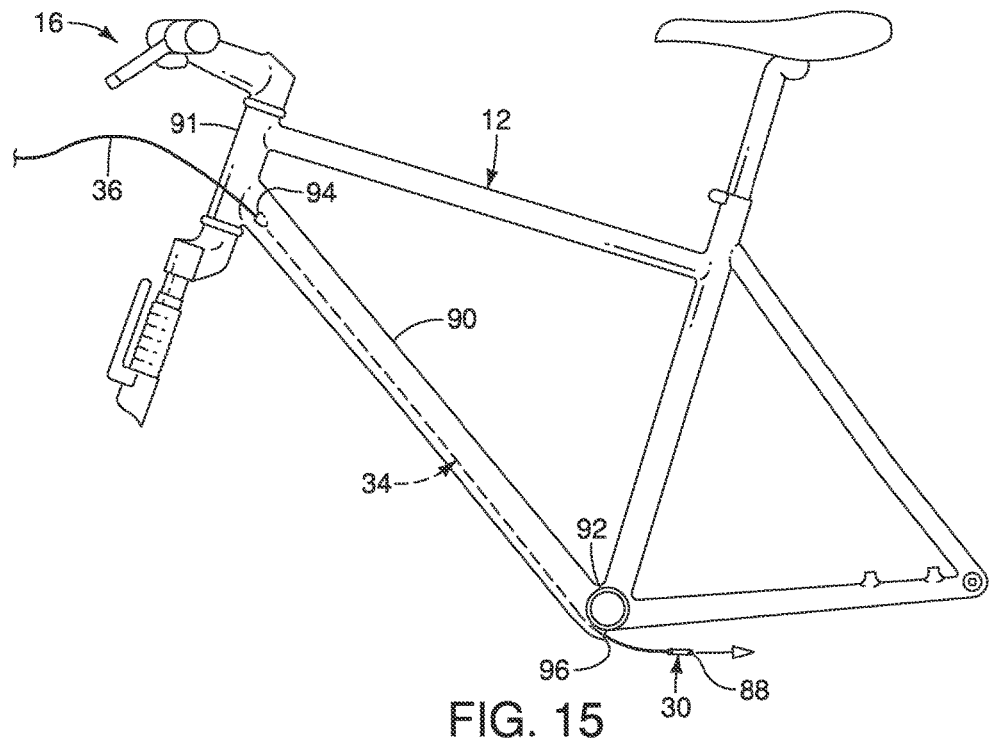
FIG. 15 is a side elevational view of a portion of the bicycle frame illustrated in FIG. 14 after pulling the pulling member through the down tube of the bicycle frame so as to exit the down tube adjacent to a hanger tube of the bicycle frame.
Figure 16:
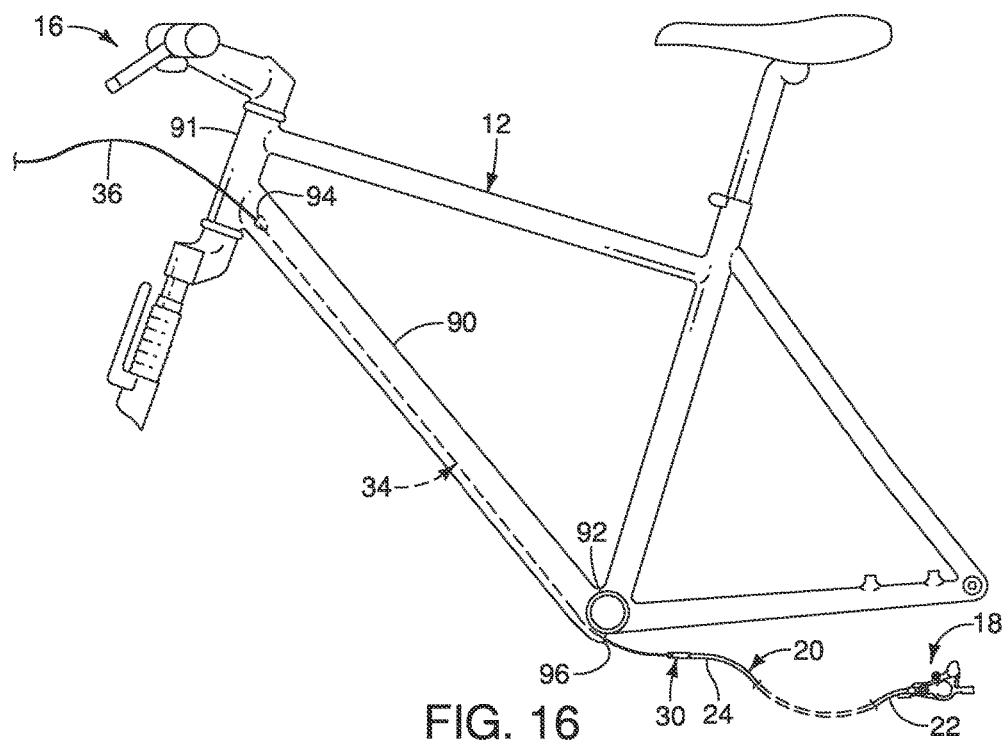
FIG. 16 is a side elevational view of a portion of the bicycle frame illustrated in FIGS. 14 and 15 after removing the scrap hydraulic hose and attaching one end of the hydraulic hose to the bicycle end cap, while the other end of the hydraulic hose is connected to the hydraulic brake caliper.

While FIGS. 14 and 15 illustrate the bicycle end cap 30 being inserted into the down tube 90 from the first opening 94 and exiting from the down tube 90 from the second opening 96, the bicycle end cap 30 can be routed in the opposite direction from the second opening 96 to the first opening 94. In either case, once the cable portion 36 of the pulling member 34 is located in the down tube 90 and extending out of the first and second openings 94 and 96 as seen in FIG. 15, the scrap hydraulic hose 88 is removed from the bicycle end cap 30 and one of the first and second connecting ends 22 and 24 of the hydraulic hose 20 is inserted into the receiving space 46 of the bicycle end cap 30. In the illustrated routing process of FIGS. 14 to 19, the second connecting end 24 of the hydraulic hose 20 is inserted into the receiving space 46 of the bicycle end cap 30, because the first connecting end 22 is already connected to the hydraulically operated device 18.

Figure 17:
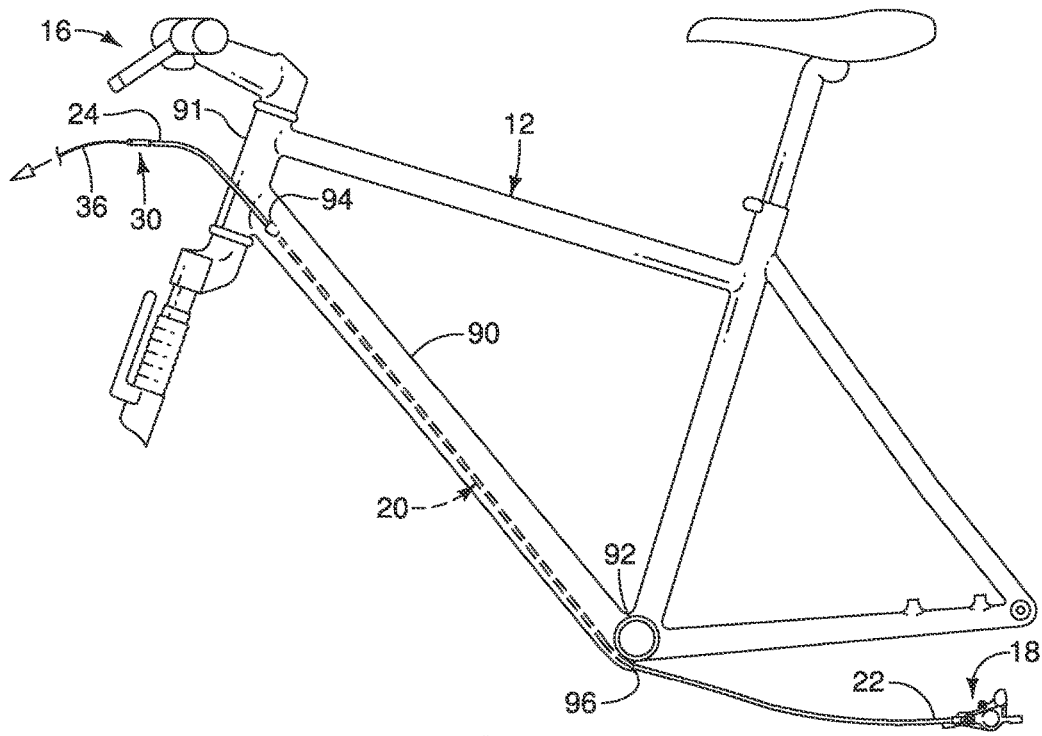
FIG. 17 is a side elevational view of a portion of the bicycle frame illustrated in FIGS. 14 to 16 with the hydraulic hose routed through the down tube of the bicycle frame and the bicycle end cap still attached to the one end of the hydraulic hose.
Figure 18:
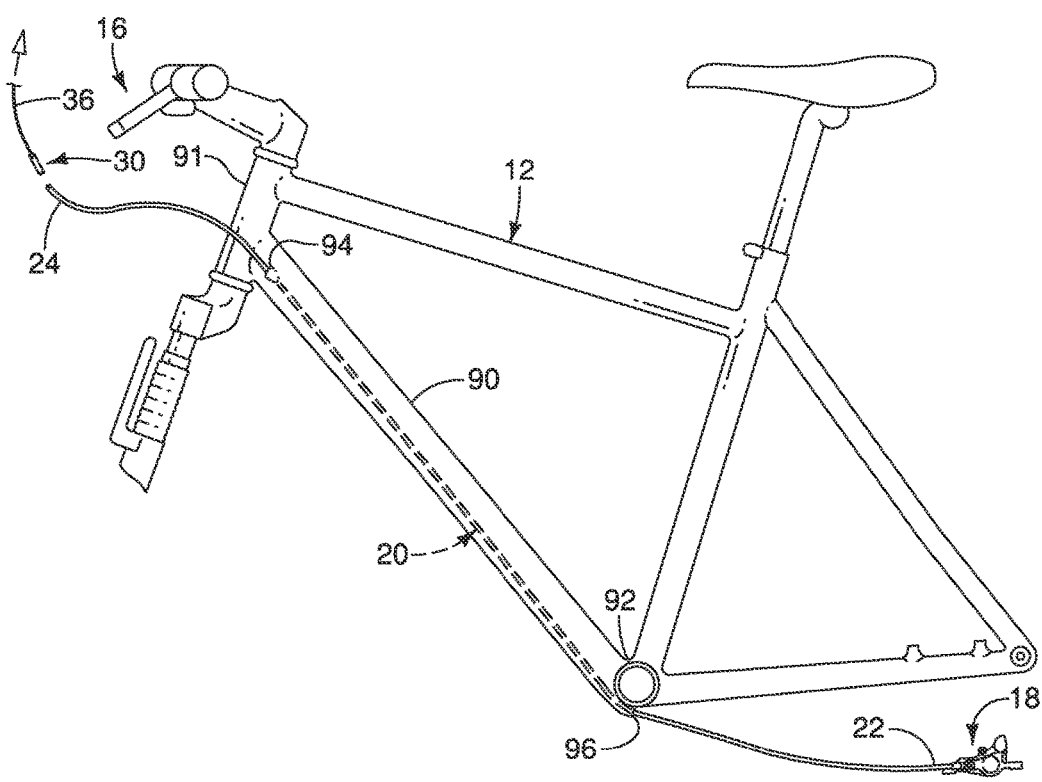
FIG. 18 is a side elevational view of a portion of the bicycle frame illustrated in FIGS. 14 to 17 with the hydraulic hose routed through the down tube of the bicycle frame and the bicycle end cap detached from the hydraulic hose.
Figure 19:
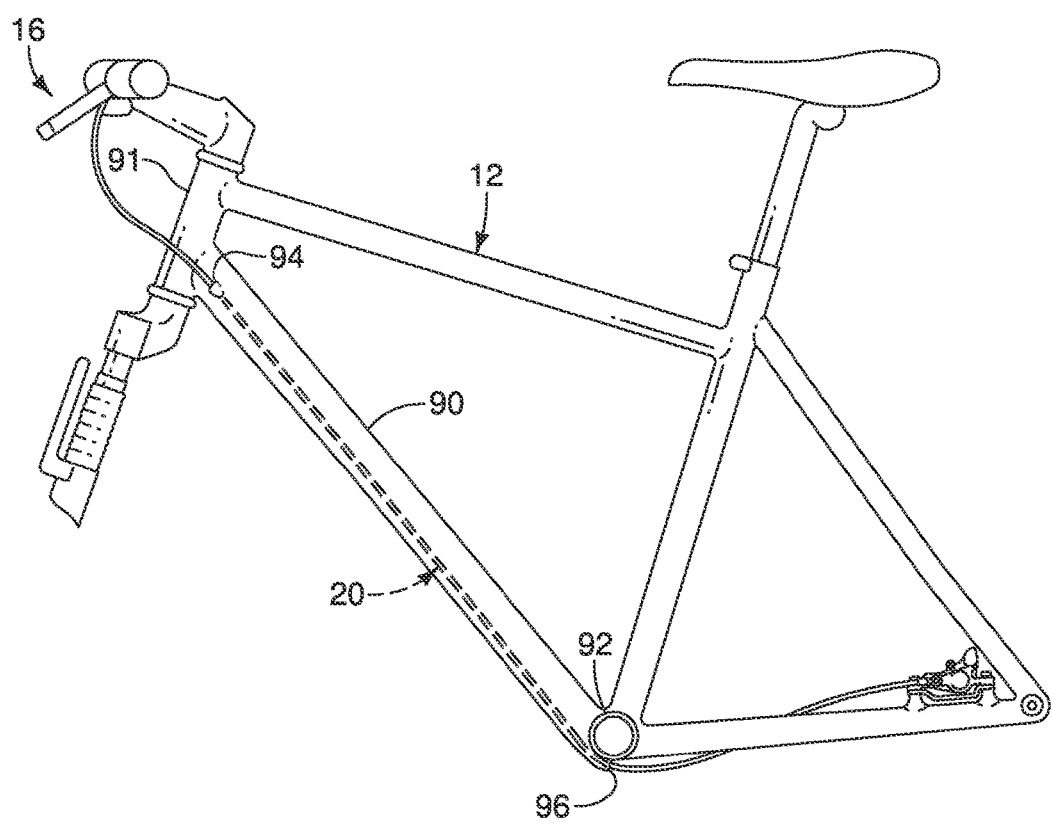
FIG. 19 is a side elevational view of a portion of the bicycle frame illustrated in FIGS. 14 to 18 after attaching the hydraulic hose to the hydraulic brake actuating device.

Now, as seen in FIG. 17, the cable portion 36 of the pulling member 34 is pulled so that the hydraulic hose 20 routed through the down tube 90 of the bicycle frame 12 with the first connecting end 22 of the hydraulic hose 20 connected to the hydraulically operated device 18 and the second connecting end 24 of the hydraulic hose 20 extending out of the first opening 94. Next, the bicycle end cap 30 is detached from the second connecting end 24 of the hydraulic hose 20 as seen in FIG. 18. Finally, as seen in FIG. 19, the second connecting end 24 of the hydraulic hose 20 is attached to the hydraulic actuating device 16 (see FIG. 2).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term. "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle end cap having a first end and a second end that is opposite to the first end for attaching to a bicycle line shape member, the bicycle end cap comprising:
    a tubular portion defining a first opening that is arranged at the first end and a receiving space that is dimension to axially receive the line shape member from the first opening; and
    an attachment structure configured to attach a pulling member having a cable portion and a head portion that has larger diameter than the cable portion, the attachment structure configured to position the head portion relative to the tubular portion as the cable portion is pulled toward the second end,
    wherein the tubular portion is configured to contact substantially an entirety of an outer circumferential surface of the head portion to position the head portion in a radial direction of the tubular portion, and the tubular portion not having an opening communicating with the receiving space in the radial direction.

2. The bicycle end cap according to claim 1, wherein the attachment structure includes a positioning portion arranged at the receiving space, and a through hole arranged at the second end such that the cable portion passes through therein as the head portion is disposed at the positioning portion.

3. The bicycle end cap according to claim 2, wherein the second end has at least one additional through hole that is transverse to a center axis of the tubular portion.

4. The bicycle end cap according to claim 3, wherein the through hole and the at least one additional through hole are arranged so as to not communicate with each other.

5. The bicycle end cap according to claim 4, wherein the through hole extends along a center axis of the tubular portion.

6. The bicycle end cap according to claim 5, wherein the at least one additional through hole extends perpendicularly relative to the center axis of the tubular portion as the tubular portion is seen in a radial direction of the tubular portion.

7. The bicycle end cap according to claim 6, wherein the at least one additional through hole includes a first additional through hole and a second additional through hole, and
the through hole is arranged between the first and second additional through holes.

8. The bicycle end cap according to claim 2, wherein the through hole extends along a center axis of the tubular portion.

9. The bicycle end cap according to claim 1, wherein the tubular portion includes a cylindrical outer surface.

10. The bicycle end cap according to claim 1, wherein the second end has a hemispherical shape.

11. The bicycle end cap according to claim 10, wherein the tubular portion includes a cylindrical outer surface which connects to the second end without unevenness.

12. A hydraulic bicycle structure including the bicycle end cap according to claim 1, the hydraulic bicycle structure comprising:
    a hydraulically operated device; and
    a hydraulic hose having a first connecting end attached to the hydraulically operated device and a second connecting end with the bicycle end cap attached thereto.

13. A hydraulic bicycle structure including the bicycle end cap according to claim 1, the hydraulic bicycle structure comprising:
    a hydraulic actuating device; and
    a hydraulic hose having a first connecting end with the bicycle end cap attached thereto and a second connecting end attached to the hydraulic actuating device.

* * * * *